(12) United States Patent
Boss

(10) Patent No.: US 11,708,683 B2
(45) Date of Patent: Jul. 25, 2023

(54) COMMISSIONING A CONSTRUCTION VEHICLE FOR MACHINE CONTROL

(71) Applicant: Trimble Inc., Sunnyvale, CA (US)

(72) Inventor: John Boss, Denver, CO (US)

(73) Assignee: Trimble Inc., Sunnyvale, CA (US)

( * ) Notice: Subject to any disclaimer, the term of this patent is extended or adjusted under 35 U.S.C. 154(b) by 207 days.

(21) Appl. No.: 17/322,338

(22) Filed: May 17, 2021

(65) Prior Publication Data
US 2022/0364322 A1 Nov. 17, 2022

(51) Int. Cl.
| *E02F 3/34* | (2006.01) |
| *E02F 3/43* | (2006.01) |
| *G01S 19/14* | (2010.01) |
| *G01S 19/47* | (2010.01) |

(52) U.S. Cl.
CPC .............. *E02F 3/437* (2013.01); *E02F 3/34* (2013.01); *G01S 19/14* (2013.01); *G01S 19/47* (2013.01)

(58) Field of Classification Search
CPC .. E02F 3/437; E02F 3/34; G01S 19/14; G01S 19/47
See application file for complete search history.

(56) References Cited

U.S. PATENT DOCUMENTS

| 8,311,710 B2 | 11/2012 | Budde et al. |
| 2012/0143433 A1 | 6/2012 | Budde et al. |
| 2013/0158789 A1 | 6/2013 | Seki |

FOREIGN PATENT DOCUMENTS

JP  2002-181538 A  6/2002

OTHER PUBLICATIONS

Extended European Search Report for Application No. 22173285.2-1206, date of completion of the search Jan. 23, 2023, 9 pages.

*Primary Examiner* — Mathew Franklin Gordon
(74) *Attorney, Agent, or Firm* — Kilpatrick Townsend & Stockton LLP

(57) ABSTRACT

Methods for commissioning a construction vehicle for machine control operations are provided. A GNSS receiver configured for determining position information, tilt information, and heading information is coupled to a rigid member of the construction vehicle. The commissioning process provides parameters that can be used for tracking and controlling movement of an implement coupled to the construction vehicle during the machine control operations.

20 Claims, 8 Drawing Sheets

COMMISSIONING A CONSTRUCTION VEHICLE FOR MACHINE CONTROL

FIELD

This application is broadly directed to commissioning a construction vehicle for machine control operations. As used herein, commissioning is a process of determining physical geometries and attributes of a construction vehicle that enable machine control.

BACKGROUND

Construction vehicles, such as loaders, diggers, graders, and the like, typically utilize hydraulically controlled implements, such as blades or buckets, to move or pick up dirt and other materials. Sometimes these vehicles include various types of sensors to track a position of a working edge of the implement. As an example, an excavator may include multiple global navigation satellite system (GNSS) units on a cab to determine location and heading of the excavator, as well as angle sensors on the boom, stick, and bucket to track a position of a cutting edge of the bucket. The sensors enable machine control of the construction vehicle to improve quality and efficiency.

Before a construction vehicle can be used for machine control, a commissioning or measure up process must be performed to determine a model based on physical geometries and attributes of the construction vehicle and various sensor locations and outputs. Despite the benefits of machine control, improvements are constantly sought to simplify workflows, improve accuracy, and reduce costs.

SUMMARY

Embodiments of the present disclosure provide improved methods for commissioning a construction vehicle for machine control operations. Using machine control operations, positions of an implement of the construction vehicle can be tracked and controlled relative to a digital design. Some embodiments use a survey pole with a GNSS receiver that is configured to provide tilt compensation. The GNSS receiver may be used to measure a position of a point on the ground, and the GNSS receiver may then be coupled to a rigid member of the construction vehicle (such as a stick of an excavator). The rigid member may be coupled to the implement at a pivot point. The implement may be touched to the point on the ground multiple times while changing an orientation between the rigid member and the implement. Positions of the GNSS receiver are determined while the implement is touching the point on the ground, and rotation of the implement between orientations is determined. Parameters that can be used for tracking movement of the implement can be determined using at least the position of the point on the ground, the positions of the GNSS receiver, and the rotation of the implement.

In accordance with a specific embodiment, a method for commissioning an excavator for machine control operations includes measuring a position of a point on a surface using a GNSS receiver, the GNSS receiver configured to receive GNSS signals for determining position information and configured to receive IMU outputs for determining tilt and heading information. The GNSS receiver is coupled to a mount on a stick of the excavator, and a bucket of the excavator is moved so that a point on an edge of the bucket touches the point on the surface. While the point on the edge of the bucket is touching the point on the surface, the GNSS receiver is used to determine a first position of the GNSS receiver on the stick, and determine a first tilt and heading of the GNSS receiver on the stick. The bucket is raised so that the point on the edge of the bucket does not touch the point on the surface, and the bucket is curled to change an orientation of the bucket relative to the stick. Curling the bucket moves the bucket from a first rotational position to a second rotational position. An angular rotation of the bucket between the first rotational position and the second rotational position is determined using outputs from an IMU coupled to the bucket. While the bucket is at the second rotational position, the bucket of the excavator is moved so that the point on the edge of the bucket touches the point on the surface. While the point on the edge of the bucket is touching the point on the surface, the GNSS receiver is used to determine a second position of the GNSS receiver on the stick, and determine a second tilt and heading of the GNSS receiver on the stick. Parameters that can be used for tracking movement of the bucket are determined based at least in part on the position of the point on the surface, the first position of the GNSS receiver on the stick, the first tilt and heading of the GNSS receiver on the stick, angular rotation of the bucket between the first rotational position and the second rotational position, the second position of the GNSS receiver on the stick, and the second tilt and heading of the GNSS receiver on the stick. A position of a working edge of the bucket is tracked during machine control operations using at least the parameters, the position information from the GNSS receiver, the tilt and heading information from the GNSS receiver, and angular rotation information from the IMU coupled to the bucket.

In an embodiment, the method also includes calibrating the IMU outputs for determining the tilt and heading information after coupling the GNSS receiver to the mount on the stick of the excavator.

In another embodiment, the GNSS receiver is coupled to a survey pole, and measuring the position of the point on the surface comprises placing a tip of the survey pole on the point on the surface. The GNSS receiver may be coupled to the mount on the stick of the excavator by coupling the survey pole to the mount.

In yet another embodiment, the parameters are also determined based on a width of the working edge of the bucket, a width of the stick, and a location of the point on the edge of the bucket.

In accordance with another embodiment, a method for commissioning an excavator for machine control operations, the excavator having a GNSS receiver removably coupled to a stick of the excavator, the GNSS receiver configured to receive GNSS signals for determining position information and configured to receive sensor outputs for determining tilt and heading information, the method includes moving a bucket of the excavator so that a point on an edge of the bucket touches a point on a surface. The point on the surface is at a known position. While the point on the edge of the bucket is touching the point on the surface, the GNSS receiver is used to determine a first position of the GNSS receiver on the stick, and determine a first tilt and heading of the GNSS receiver on the stick. The bucket is raised so that the point on the edge of the bucket does not touch the point on the surface, and the bucket is curled to change an orientation of the bucket relative to the stick. Curling the bucket moves the bucket from a first rotational position to a second rotational position. An angular rotation of the bucket between the first rotational position and the second rotational position is determined using outputs from one or more sensors coupled to the bucket. While the bucket is at the second rotational position, the bucket of the excavator is moved so that the point on the edge of the bucket touches the point on the surface. While the point on the edge of the bucket is touching the point on the surface, the GNSS receiver is used to determine a second position of the GNSS receiver on the stick, and determine a second tilt and heading of the GNSS receiver on the stick. Parameters that can be used for tracking movement of the bucket are determined based at least in part on the position of the point on the surface, the first position of the GNSS receiver on the stick, the first tilt and heading of the GNSS receiver on the stick, angular rotation of the bucket between the first rotational position and the second rotational position, the second position of the GNSS receiver on the stick, and the second tilt and heading of the GNSS receiver on the stick.

In an embodiment, the method also includes obtaining additional measurement information by repeating one or more times the steps of raising the bucket, curling the bucket, determining angular rotation of the bucket, moving the bucket so that the point on the edge of the bucket touches the point on the surface, and using the GNSS receiver to determine position, tilt, and heading information, and using the additional measurement information in determining the parameters.

In another embodiment, the parameters are also determined based on a width of a working edge of the bucket, a width of the stick, and a location of the point on the edge of the bucket.

In another embodiment, the sensor outputs for determining the tilt and heading information are received from an IMU integrated with the GNSS receiver.

In another embodiment, the point on the surface is a rigid point that is in approximately the same position in world coordinates before and after being touched by the point on the edge of the bucket.

In another embodiment, the point on the surface is raised relative to surrounding portions of the surface so that the point on the edge of the bucket touches the point on the surface at the first rotational position of the bucket in a fully extended position and at the second rotational position of the bucket in a fully retracted position.

In another embodiment, the method also includes mounting a mobile controller of the GNSS receiver in a cab of the excavator after using the mobile controller to measure the first position of the point on the surface.

In another embodiment, the one or more sensors coupled to the bucket are attached to a linkage between the stick and bucket.

In another embodiment, the method also includes tracking a position of a working edge of the bucket during machine control operations using at least the parameters, the position information from the GNSS receiver, the tilt and heading information from the sensor outputs, and angular rotation information from the one or more sensors coupled to the bucket.

In yet another embodiment, the method also includes measuring the position of the point on the surface using the GNSS receiver to provide the known position, and coupling the GNSS receiver to the stick of the excavator.

In accordance with yet another embodiment, a method for commissioning a construction vehicle for machine control operations, the construction vehicle having a GNSS receiver removably coupled to a rigid member of the construction vehicle, the GNSS receiver configured to receive GNSS signals for determining position information and configured to receive sensor outputs for determining tilt and heading information, the method includes moving an implement of the construction vehicle so that a point on a working edge of the implement touches a point on a surface. The point on the surface is at a known position. While the point on the working edge of the implement is touching the point on the surface, the GNSS receiver is used to determine a first position of the GNSS receiver on the rigid member, and determine a first tilt and heading of the GNSS receiver on the rigid member. The implement is raised using the rigid member so that the point on the working edge of the implement does not touch the point on the surface, and the implement is curled to change an orientation of the implement relative to the rigid member. Curling the implement moves the implement from a first rotational position to a second rotational position. An angular rotation of the implement between the first rotational position and the second rotational position is determined using outputs from one or more sensors coupled to the implement. While the implement is at the second rotational position, the implement of the construction vehicle is moved so that the point on the working edge of the implement touches the point on the surface. While the point on the working edge of the implement is touching the point on the surface, the GNSS receiver is used to determine a second position of the GNSS receiver on the rigid member, and determine a second tilt and heading of the GNSS receiver on the rigid member. Parameters that can be used for tracking movement of the implement are determined based at least in part on the position of the point on the surface, the first position of the GNSS receiver on the rigid member, the first tilt and heading of the GNSS receiver on the rigid member, angular rotation of the implement between the first rotational position and the second rotational position, the second position of the GNSS receiver on the rigid member, and the second tilt and heading of the GNSS receiver on the rigid member.

In an embodiment, the method also includes measuring the position of the point on the surface using the GNSS receiver to provide the known position, and coupling the GNSS receiver to the rigid member of the construction vehicle.

In another embodiment, the sensor outputs received by the GNSS receiver are provided by an IMU integrated with the GNSS receiver, and the one or more sensors coupled to the implement include one or more IMUS.

In another embodiment, the construction vehicle is a skidsteer, and the implement is a bucket coupled to the skidsteer by the rigid member, the rigid member including arms of the skidsteer.

In another embodiment, the method also includes tracking a position of the working edge of the implement during machine control operations using at least the parameters, the position information from the GNSS receiver, the tilt and heading information from the sensor outputs, and angular rotation information from the one or more sensors coupled to the implement.

In yet another embodiment, the method also includes calibrating the GNSS receiver for determining the tilt and heading information after coupling the GNSS receiver to the rigid member of the construction vehicle.

Numerous benefits are achieved using embodiments described herein over conventional techniques. Some embodiments, for example, simplify a commissioning process. Some conventional commissioning techniques require numerous physical measurements to determine physical geometries and attributes of a construction vehicle and implement. Some embodiments described herein significantly reduce the number of measurements required to commission a construction vehicle. Also, some embodiments described herein can significantly reduce the time required to commission a construction vehicle compared to conventional techniques. These embodiments can save time and reduce costs. Depending on the embodiment, one or more of these features and/or benefits may exist.

BRIEF DESCRIPTION OF THE DRAWINGS

The accompanying drawings, which are included to provide a further understanding of the embodiments described herein, are incorporated in and constitute a part of this specification, illustrate various embodiments, and together with the detailed description, serve to explain some principles of operation. No attempt is made to show features in more detail than may be necessary for a fundamental understanding of the various embodiments and ways in which they may be practiced.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

Embodiments of the present disclosure provide methods for commissioning a construction vehicle for machine control operations. As an example, some embodiments touch an implement of a construction vehicle to a point at a known position at different orientations of the implement. Parameters may be determined that can be used for tracking movement of the implement using the known position along with position and orientation information of the construction vehicle.

An excavator and skidsteer are used herein as exemplary construction vehicles. Embodiments of the present disclosure can also be used with other types of construction vehicles. For example, the methods described herein can be used with other diggers that include sticks, other loaders that include arms, as well as dozers, graders, and similar construction vehicles that include frames (e.g., C-Frames). One of ordinary skill in the art would understand how to use the methods with other construction vehicles based on the examples provided herein.

Also, a bucket and blade are used herein as exemplary implements that may be coupled to construction vehicles. Embodiments of the present disclosure can also be used with other types of implements that are permanently or removably coupled to construction vehicles. For example, the methods described herein can be used with any of the numerous types of implements that can be coupled to construction vehicles. Additionally, the methods described herein can be used to track the position of any particular part of the implement. The working edge is used herein to refer specifically, for example, to a cutting edge of a bucket or blade, or generally to a particular part or point on the implement. In some embodiments, the working edge refers to a particular part of the implement whose position is tracked in machine control operations.

Figure 1C:
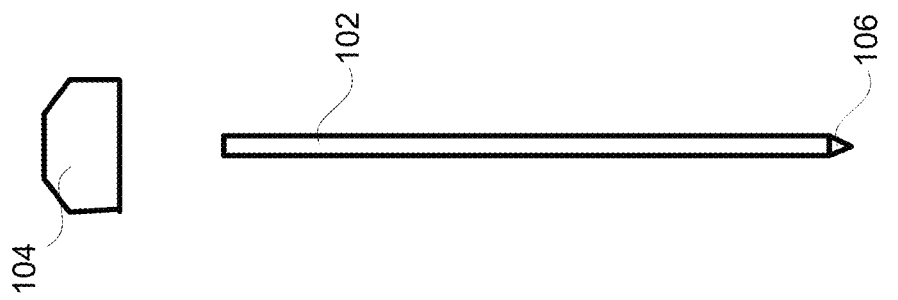
FIGS. 1A-1C are simplified drawings of a GNSS unit and conventional survey poles or grade rods.
Figure 1B:
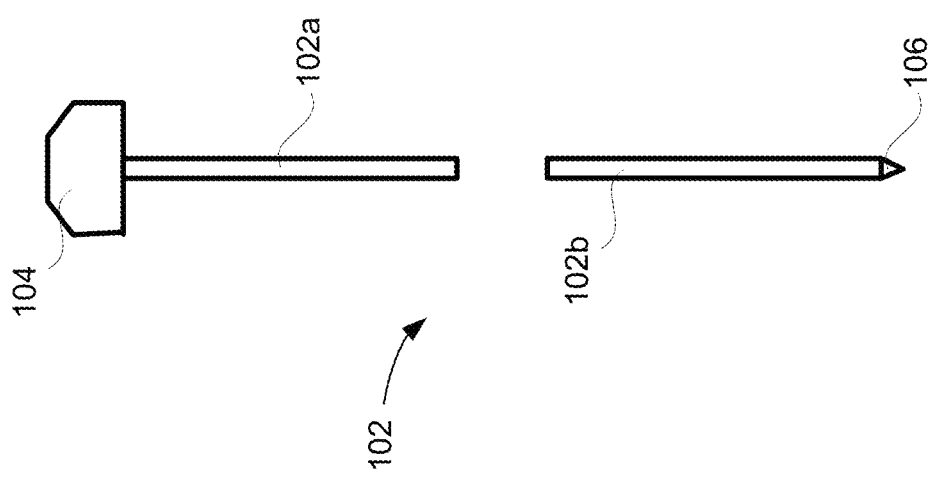
Figure 1A:
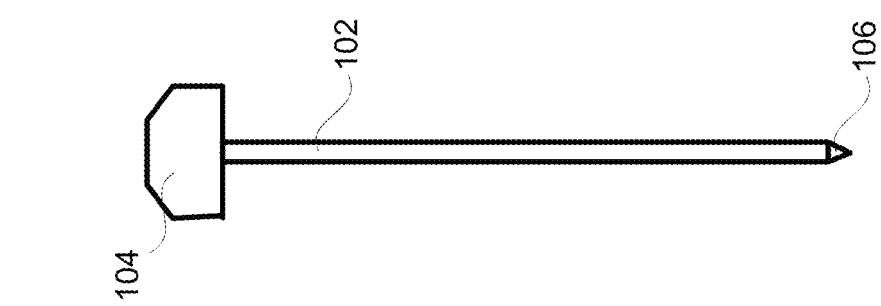

FIGS. 1A-1C are simplified drawings of a GNSS unit 104 and conventional survey poles or grade rods 102. The GNSS unit 104 and survey pole 102 may be a conventional GNSS rover. In FIG. 1A, the survey pole 102 is a single piece that extends between the GNSS unit 104 and a tip 106. The tip 106 is configured to be placed at a measurement point during conventional survey measurements.

In FIG. 1B, the survey pole 102 includes a top portion 102a that is detached from a bottom portion 102b. The top and bottom portions 102a, 102b may include threads or other conventional attachment means that allow the top portion 102a to be removably attached to the bottom portion 102b. The GNSS unit 104 and tip 106 may also be removably attached to the survey pole 102.

In FIG. 1C, the GNSS unit 104 is detached from the survey pole 102. The GNSS unit 104 and/or the survey pole 102 may include threads or other conventional attachment means that allow the GNSS unit 104 to be attached to and removed from the survey pole 102.

FIGS. 1A-1C provide examples of single piece and multi-piece survey poles. Other survey pole configurations exist including telescoping poles and multi-leg poles such as tripods. The embodiments described herein are not limited to a particular type of survey pole and may be implemented with any survey pole including the single piece survey pole shown in FIGS. 1A and 1C, as well as the multi-piece survey pole shown in FIG. 1B.

The GNSS unit 104 includes an antenna for receiving GNSS signals and a receiver for processing the signals and determining position information. In some embodiments, a remote computing device (e.g., a cell phone or mobile controller) may perform part of the processing. Thus, when the GNSS unit is described herein as determining a position or position information, it should be appreciated that the GNSS signals are received by the antenna and at least some of the processing is performed by the receiver. A part of the processing may be performed by another computing device.

The GNSS unit 104 may include a radio, modem, or other means for wireless communications. As examples, the GNSS unit 104 may be configured to receive GNSS corrections using satellite, radio, WiFi, or other wireless communications. The GNSS unit 104 may also be configured to send partially processed GNSS signals or position information to a computing device such as a mobile controller.

The GNSS unit 104 also includes other sensors to determine tilt and heading information. The position, tilt, and heading information can be determined in accordance with any known technique and typically requires an initialization process that may be dependent on the particular device. An example of a GNSS unit 104 that can determine position, tilt, and heading information is the Trimble SPS986 GNSS Smart Antenna. Other GNSS units exist that can also provide this information. The embodiments described herein are not limited to a particular configuration and can be used with any GNSS unit configured to provide these features.

Figure 2:
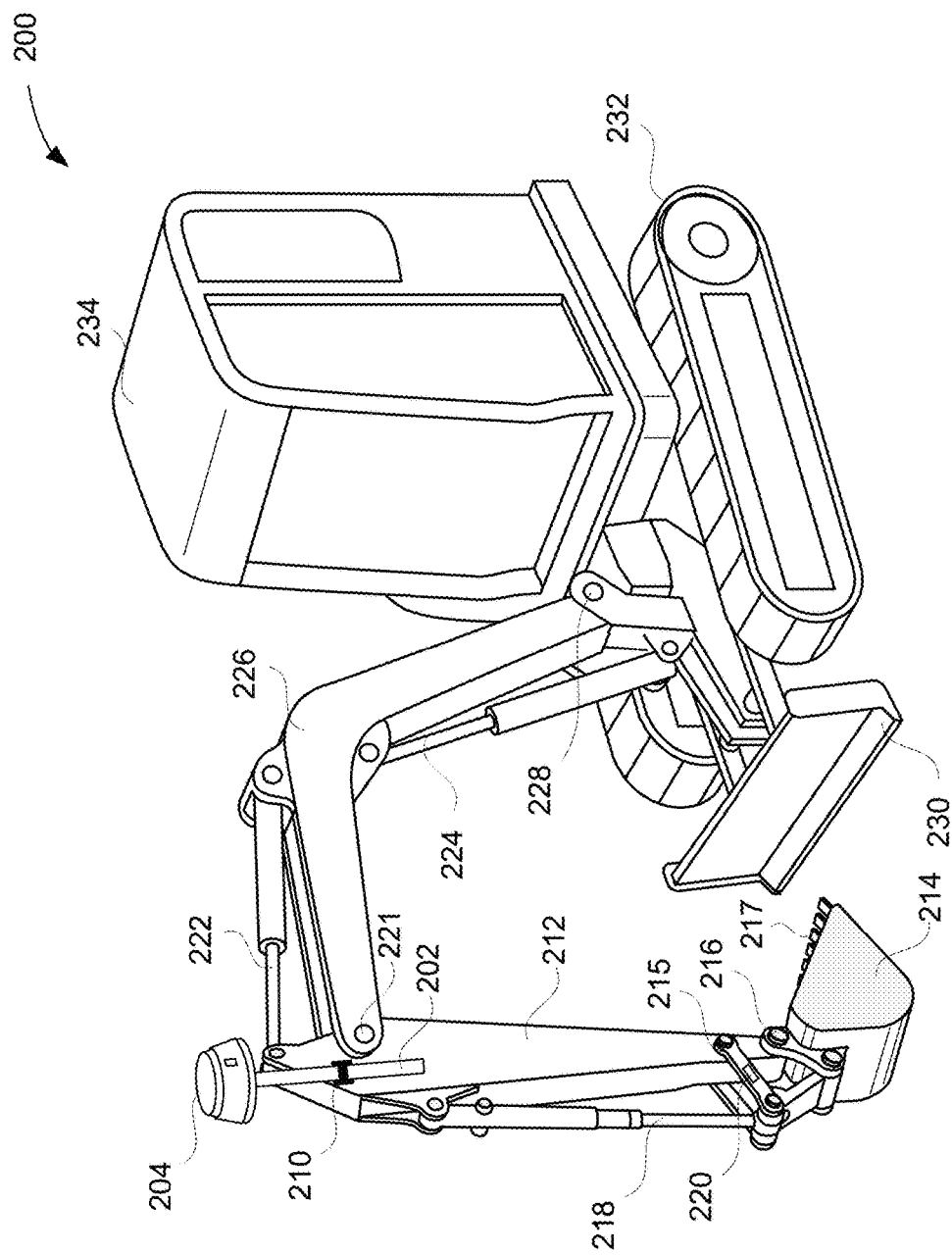
FIG. 2 is a simplified perspective view of an excavator with a GNSS unit coupled to a stick of the excavator.

FIG. 2 is a simplified perspective view of an excavator 200 with a GNSS unit 204 coupled to a stick 212 of the excavator 200. As explained in detail below, and in particular with regard to FIGS. 5A-5B and FIG. 6, the GNSS unit 204 may be used for commissioning the excavator 200. The commissioning process allows the excavator 200 to be used with machine control operations.

The excavator 200 in this example includes a cab 234 for an operator to control the various functions of the excavator 200 and tracks 232 for tramming the excavator 200 from one location to another. In other embodiments, the excavator may include wheels or other means for providing translational movement rather than the tracks 232. The excavator 200 in this example also includes a blade 230 for moving dirt or debris and for providing stabilization during digging operations.

A boom 226, stick 212, and bucket 214 enable digging operations. The boom 226 and stick 212 are rigid members that link the bucket 214 to a body of the excavator 200. The boom 226 is coupled to the body at a pivot point 228 and is moved up and down by a hydraulic mechanism 224. The stick 212 is coupled to the boom 226 at a pivot point 221 and is moved in and out by a hydraulic mechanism 222. The bucket 214 is coupled to the stick 212 at a pivot point 216 and is moved (or curled) by a hydraulic mechanism 218. It should be appreciated that each of the parts of the excavator may be coupled directly to each other or may be coupled indirectly by other intermediate linkages.

A survey pole 202 is coupled to the stick 212, and the GNSS unit 204 is coupled to the survey pole 202. The survey pole 202 may be arranged relative to the stick 212 so that the GNSS unit 204 remains free from contact with any part of the excavator 200, including the boom 226 and the stick 212, during a full range of motion of the boom 226, the stick 212, and/or the bucket 214. The GNSS unit 204 includes an antenna for receiving GNSS signals and is configured to determine a three-dimensional position (or coordinates) of the antenna in a real world coordinate frame. The GNSS unit 204 also includes other sensors for determining a tilt and heading of the survey pole 202, and hence a tilt and heading of the stick 212, in the real world coordinate frame.

In this example, the survey pole 202 is coupled to the stick 212 using a mounting mechanism 210. The GNSS unit 204 may be arranged in a known spatial relationship with the pivot point 216 between the stick 212 and the bucket 214. Coordinates of the pivot point 216 can be determined in the real world coordinate frame in a manner similar to how a conventional GNSS rover with tilt compensation determines coordinates at a tip of the survey pole. In some embodiments, the survey pole 202 may be aligned with the pivot point 216 and the known spatial relationship may be a distance between the GNSS unit 204 (or the antenna) and the pivot point 216. In other embodiments, the known spatial relationship may include horizontal and vertical offsets between the GNSS unit 204 (or the antenna) and the pivot point 216.

The survey pole 202 in FIG. 2 does not include a tip like that used for conventional rover measurements. In this example, the survey pole 202 only includes an upper portion similar to the top portion 102a shown in FIG. 1B. This is simply to reduce an overall length so that the survey pole 202 is less likely to be damaged or bumped. A full length survey pole having a tip, including a multi-leg survey pole, may be used with an appropriate mounting mechanism and any of the embodiments described herein.

The mounting mechanism 210 rigidly couples the survey pole 202 to the stick 212. Using the mounting mechanism 210, the survey pole 202 may be removably attached to the stick 212. For example, the survey pole 202 may be attached to the stick 212 for use in tracking a cutting edge 217 of the bucket 214, and the survey pole 202 may be detached from the stick 212 for use in performing conventional GNSS survey measurements.

The mounting mechanism 210 and/or the survey pole 202 may be configured so that the survey pole 202 can be rigidly attached to the mounting mechanism 210 in a repeatable position and orientation. The mounting mechanism 210 and/or the survey pole 202 may also be configured so that when the survey pole 202 is attached to the mounting mechanism 210, the antenna of the GNSS unit 204 is arranged in approximately a known spatial relationship with the pivot point 216. This allows the survey pole 202 to be detached and re-attached without changing the known spatial relationship between the antenna of the GNSS unit 204 and the pivot point 216. The survey pole 202 may have a notch, mark, mounting receiver, or the like to ensure the survey pole 202 is attached at a same point each time. Alternatively or additionally, the mounting mechanism 210 may be arranged to receive the survey pole 202 at a same point each time. The mounting mechanism 210 and/or the survey pole 202 may also be configured so that when the survey pole 202 is attached to the mounting mechanism 210, an orientation of the GNSS unit 204 relative to the mounting mechanism 210 is approximately the same each time.

An angle sensor 220 is coupled either directly or indirectly to the bucket 214. In this example, the angle sensor 220 is coupled indirectly to the bucket 214 and directly to a part of the linkage 215 that connects the stick 212 to the bucket 214. The angle sensor 220 may be used to determine rotation of the bucket 214. Because the bucket 214 is used for digging and other functions, the angle sensor 220 may be mounted on the part of the linkage 215 (e.g., the dog bone) where rotation of the bucket 214 can be determined while protecting the angle sensor 220 from contact with dirt or other materials that may damage the angle sensor 220 and/or impact sensor measurements. The angle sensor 220 may be an inertial measurement unit (IMU) or other sensor configured to determine or track rotation.

As the bucket 214 rotates (or curls), a distance between the pivot point 216 and the cutting edge 217 of the bucket 214 remains constant so that a spatial relationship between the pivot point 216 and the cutting edge 217 is fixed. Thus, coordinates of the cutting edge 217 can be determined in the real world coordinate frame using the position of the antenna, the tilt and heading of the survey pole 202, the known spatial relationship between the GNSS unit 204 (or antenna) and the pivot point 216, the rotation of the bucket 214, and the spatial relationship between the pivot point 216 and the cutting edge 217.

Using a width of the bucket 214 and a spatial relationship between the cutting edge 217 and the pivot point 216, coordinates of any point along the cutting edge 217 of the bucket 214 can be determined (assuming the bucket 214 does not tilt). If the bucket 214 tilts in addition to curling, a second angle sensor can be used to determine the tilt of the bucket 214 (or the same angle sensor may be used to determine curl and tilt). Using the tilt of the bucket 214 and the spatial relationship between the pivot point 216 and the cutting edge 217, in addition to the position of the antenna, the tilt and heading of the survey pole 202, the known spatial relationship between the GNSS unit 204 (or antenna) and the pivot point 216, and the rotation of the bucket 214, the coordinates of the cutting edge 217 can be determined in the real world coordinate frame.

The coordinates of the cutting edge 217 may be determined using a mobile controller. The mobile controller may be a controller that is normally used in conjunction with the survey pole 202 and GNSS unit 204 to perform conventional GNSS survey measurements, or the mobile controller may be a separate device such as a cell phone. The mobile controller may be configured for wired or wireless communications with the GNSS unit 204 and the angle sensor 220. The mobile controller receives the position of the antenna, the tilt, and the heading from the GNSS unit 204, and the mobile controller receives the rotation of the bucket 214 from the angle sensor 220. The mobile controller may also receive or have in memory the known spatial relationship between the GNSS unit 204 (or antenna) and the pivot point 216, the distance between the pivot point 216 and the cutting edge 217 of the bucket 214, the width of the cutting edge 217 of the bucket 214, and/or a spatial relationship between the cutting edge 217 and the pivot point 216.

The excavator 200 shown in FIG. 2 is used merely as an example of a construction vehicle that includes a rigid member (e.g., the stick 212) coupled to an implement (e.g., the bucket 214) at a pivot point. Other excavators having different configurations may be used with the embodiments described herein. Examples of other excavators include backhoes or more complex construction vehicles such as multi-piece boom excavators, offset boom excavators, swing boom excavators, and the like. The embodiments described herein can simplify tracking of a working edge of an implement on complex construction vehicles by reducing a number of sensors and eliminating the need to track a position or orientation of the boom. The embodiments described herein can also simplify the commissioning process. With more complex construction vehicles, the GNSS unit 204 may be coupled to the last rigid member that is coupled either directly or indirectly to the implement.

Figure 3:
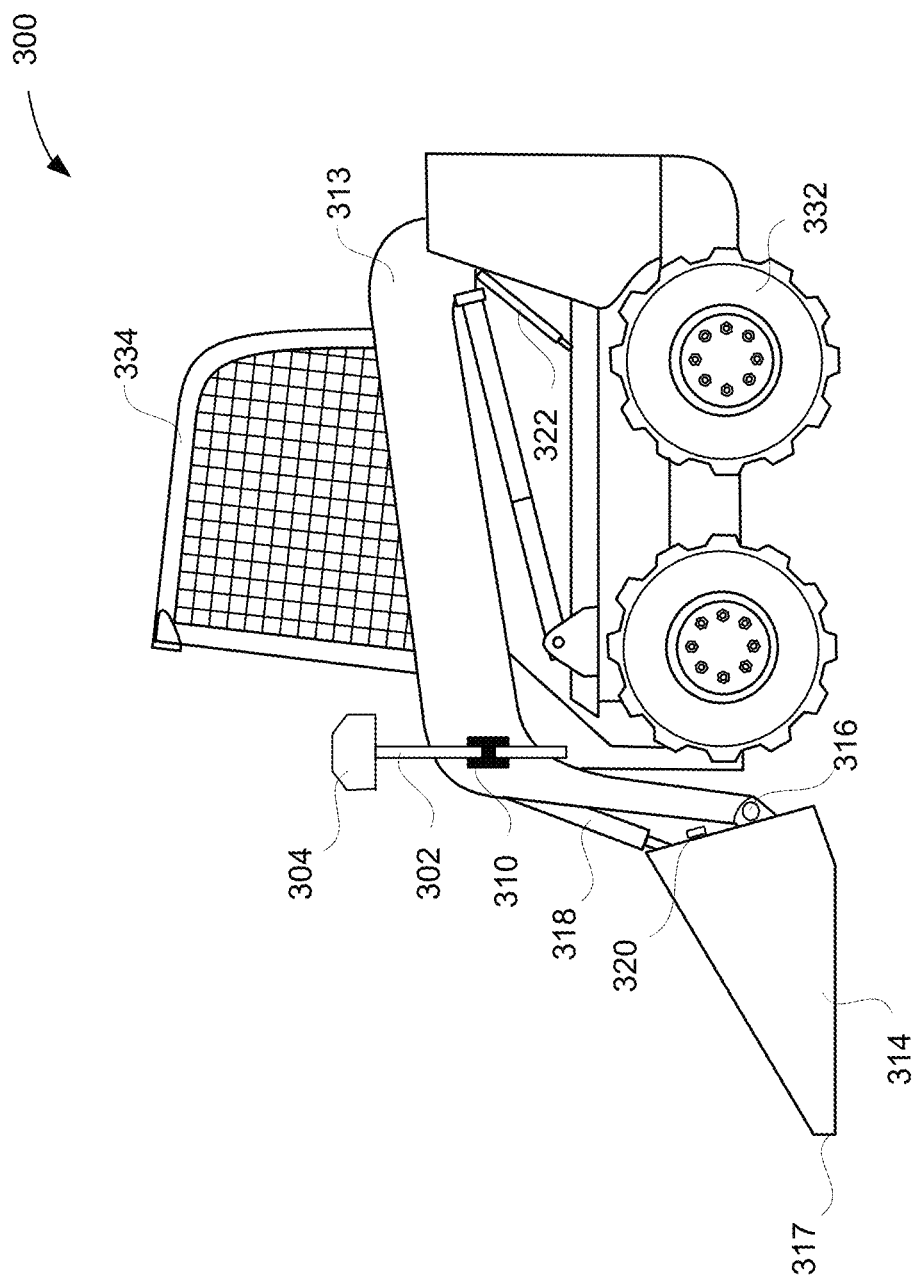
FIG. 3 is a simplified side view of a skidsteer with a GNSS unit coupled to an arm of the skidsteer.

FIG. 3 is a simplified side view of a skidsteer 300 with a GNSS unit 304 coupled to an arm 313 of the skidsteer 300. The skidsteer 300 includes a cab 334 for an operator to control the various functions of the skidsteer 300 and wheels 332 for providing translational movement of the skidsteer 300. In other embodiments, the skidsteer may include tracks or other means for providing translational movement.

Arms 313 (only one is shown in the side view) enable movement of bucket 314. The arms 313 are rigid members that link the bucket 314 to a body of the skidsteer 300. The arms 313 are coupled to the body of the skidsteer 300 at a pivot point (not shown) and are moved up and down by a hydraulic mechanism (not shown). The bucket 314 is coupled to the arms 313 at a pivot point 316 and is moved (or curled) by a hydraulic mechanism 318.

A survey pole 302 is coupled to one of the arms 313, and the GNSS unit 304 is coupled to the survey pole 302. The survey pole 302 may be arranged relative to the arms 313 so that the GNSS unit 304 remains free from contact with any part of the skidsteer 300, including the arms 313 and the bucket 314, during a full range of motion of the arms 313 and/or the bucket 314. The GNSS unit 304 includes an antenna for receiving GNSS signals and is configured to determine a three-dimensional position (or coordinates) of the antenna in a real world coordinate frame. The GNSS unit 304 also includes other sensors for determining a tilt and heading of the survey pole 302 in the real world coordinate frame.

In this example, the survey pole 302 is coupled to one of the arms 313 using a mounting mechanism 310. The GNSS unit 304 may be arranged in a known spatial relationship with the pivot point 316 between the arms 313 and the bucket 314. Coordinates of the pivot point 316 can be determined in the real world coordinate frame in a manner similar to how a conventional GNSS rover with tilt compensation determines coordinates at a tip of the survey pole. In some embodiments, the survey pole 302 may be aligned with the pivot point 316 and the known spatial relationship may be a distance between the GNSS unit 304 (or the antenna) and the pivot point 316. In other embodiments, like the example shown in FIG. 3, the known spatial relationship may include horizontal and vertical offsets between the GNSS unit 304 (or the antenna) and the pivot point 316.

Similar to the example shown in FIG. 2, the survey pole 302 in FIG. 3 does not include a tip like that used for conventional rover measurements. Instead, the survey pole 302 only includes an upper portion similar to the top portion 102a shown in FIG. 1B. A full length survey pole having a tip, including a multi-leg survey pole, may be used with any of the embodiments described herein.

The mounting mechanism 310 rigidly couples the survey pole 302 to one of the arms 313. Using the mounting mechanism 310, the survey pole 302 may be removably attached to the arm. For example, the survey pole 302 may be attached to one of the arms 313 for use in tracking a cutting edge 317 of the bucket 314, and the survey pole 302 may be detached from the skidsteer 300 and used to perform conventional GNSS survey measurements. The mounting mechanism 310 and/or the survey pole 302 may be configured as described above with regard to FIG. 2 so that a known spatial relationship between the GNSS unit 304 and the pivot point 316 is substantially the same each time the survey pole 302 is coupled to the skidsteer 300.

An angle sensor 320 is coupled either directly or indirectly to the bucket 314. In this example, the angle sensor 320 is coupled to a backside of the bucket 314 where it is protected from contact with dirt or other materials that may damage the angle sensor 320 and/or impact sensor measurements. The angle sensor 320 may be used to determine rotation of the bucket 314. The angle sensor 320 may be an IMU or other sensor configured to determine rotation.

As the bucket 314 rotates (or curls), a distance between the pivot point 316 and the cutting edge 317 of the bucket 314 remains constant so that a spatial relationship between the pivot point 316 and the cutting edge 317 is fixed. Thus, coordinates of the cutting edge 317 can be determined in the real world coordinate frame in a manner similar to that described above with regard to FIG. 2.

The skidsteer 300 shown in FIG. 3 is used merely as an example of a construction vehicle that includes rigid members (e.g., the arms 313) coupled to an implement (e.g., the bucket 314) at a pivot point (e.g., pivot point 316). Other loaders having arms, or dozers or graders having frames, may be used in a similar manner with the embodiments described herein.

Figure 4:
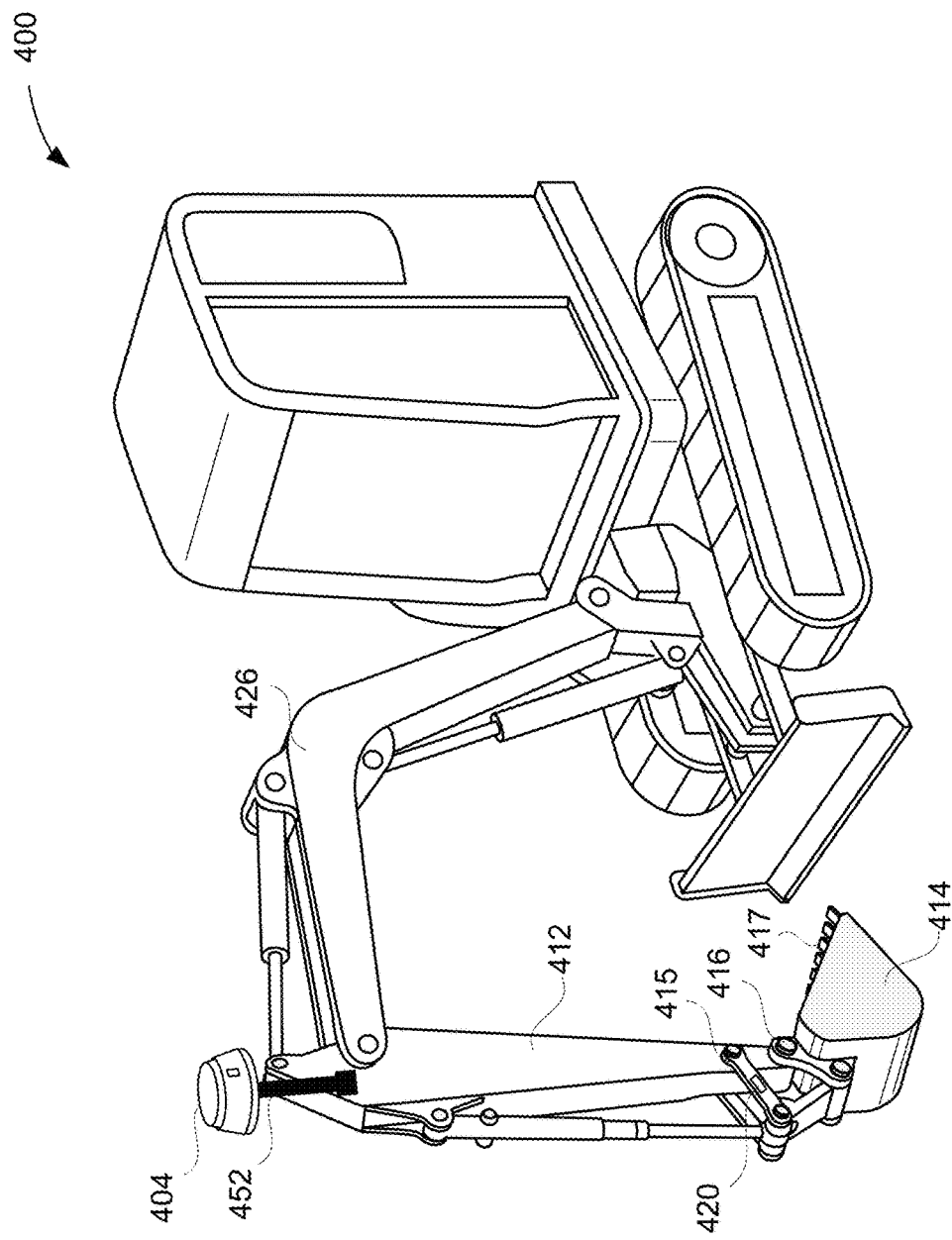
FIG. 4 is a simplified perspective view of another excavator with a GNSS unit coupled to a stick of the excavator.

FIG. 4 is a simplified perspective view of another excavator 400 with a GNSS unit 404 coupled to a stick 412 of the excavator 400. The excavator 400 is similar to the excavator 200 shown in FIG. 2, and a description of the various features can be found in the description of FIG. 2 above.

In this example, the GNSS unit 404 is coupled to a mount 452 on a stick 412 of the excavator 400. The mount 452 may be permanently or removably attached to the stick 412. The GNSS unit 404 and the mount 452 may include threads or other attachment means for removable coupling the GNSS unit 404 to the mount 452. The GNSS unit 404 may be used in a manner similar to the GNSS unit 204 in FIG. 2 to determine coordinates of a cutting edge 417 of bucket 414. Other features of the excavator 400, including boom 426, angle sensor 420, linkage 415, and pivot point 416, may be configured in a manner similar to the corresponding features of the excavator 200 described above with regard to FIG. 2.

The excavator 400 shown in FIG. 4 is used merely as an example of a construction vehicle that includes a rigid member (e.g., the stick 412) coupled to an implement (e.g., the bucket 414) at a pivot point (e.g., pivot point 416). This example includes a mount 452 for the GNSS unit 404. A similar mount may be used with other construction vehicles. For example, the embodiment described with regard to FIG. 4 may be used with other excavators, skidsteers, and backhoes, or with more complex construction vehicles such as multi-piece boom excavators, offset boom excavators, swing boom excavators, and the like. With more complex construction vehicles, the GNSS unit may be coupled to a mount on the last rigid member that is coupled either directly or indirectly to the implement.

The excavator 200 shown in FIG. 2, the skidsteer 300 shown in FIG. 3, and the excavator 400 shown in FIG. 4 are examples of construction vehicles that can be operated under machine control. Using machine control, a working edge of an implement can be tracked and controlled relative to a digital design. For example, the digital design may specify a particular grade or contour for plot of ground, and the machine control algorithms, running on a controller, can control the implement (e.g., bucket or blade) to dig to the designed grade or form the designed contour.

Some known machine control algorithms use a model that is based on physical geometries and attributes of the construction vehicle to track and control movement. These models are typically generated using a number of physical measurements and attributes of the construction vehicle as inputs. For example, conventional methods for generating a model of an excavator may require measurements from a reference point on a body of the excavator to a pivot point between the body and boom, measurements from the pivot point between the body and boom to a pivot point between the boom and stick, measurements from the pivot point between the boom and stick to a pivot point between the stick and bucket, and measurements from the pivot point between the stick and buck to one or more points along a working edge of the bucket. Locations and outputs from sensors are also generally required.

In contrast to conventional methods, embodiments described herein reduce the number of measurements and simplify the commissioning process. A commissioning process in accordance with an embodiment can be described with regard to FIG. 4. The GNSS unit 404 may be used with a survey pole to measure a position of a point on a surface (e.g., the ground) using conventional survey methods. The GNSS unit 404 may then be coupled to the stick 412 of the excavator either using a survey pole and mounting mechanism as illustrated in FIG. 2, or using the mount 452 as illustrated in FIG. 4. Alternatively, a point on a surface having known coordinates may be used for the commissioning process rather than measuring the position of the point using the GNSS unit 404.

Depending on requirements of the particular GNSS unit 404, sensors for determining tilt and heading information may be calibrated after coupling the GNSS unit 404 to the stick 412 (if necessary). Calibration procedures are typically provided by the manufacturer of the GNSS unit 404.

Figure 5A:
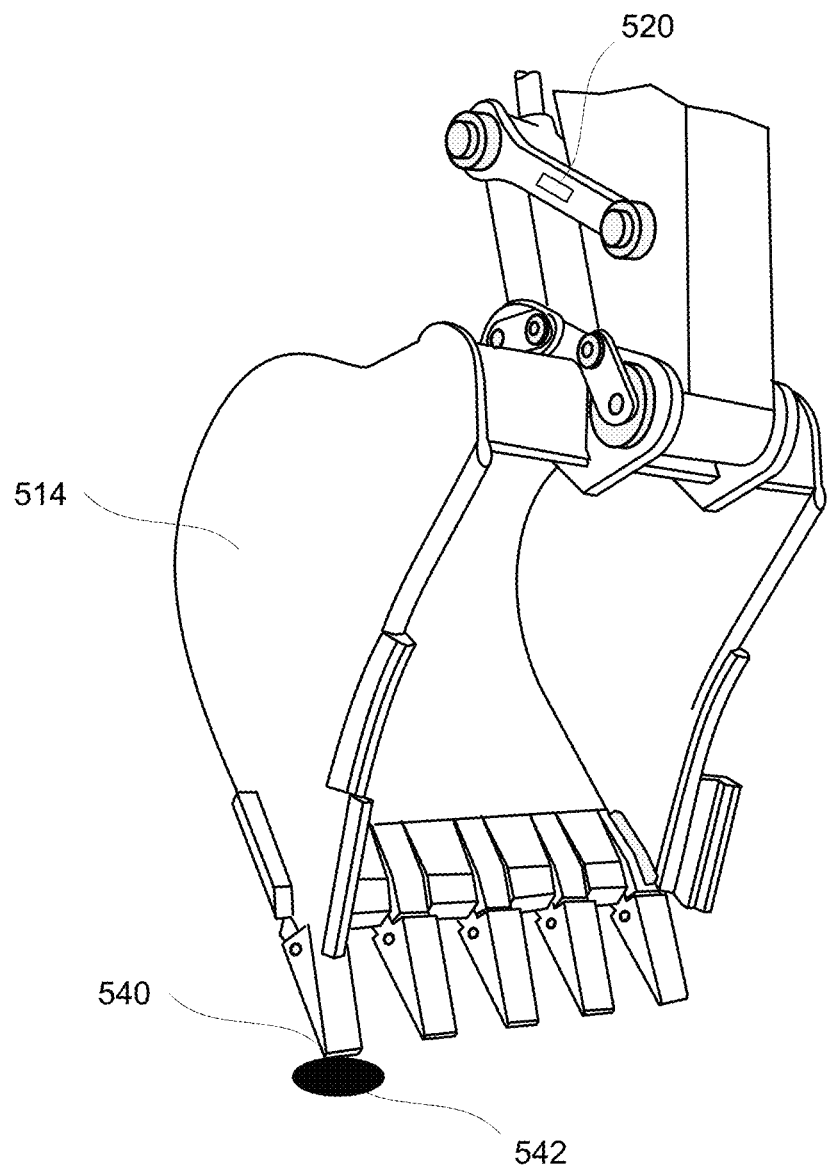
FIGS. 5A-5B are simplified perspective views of a bucket of a construction vehicle touching a point on a surface in accordance with an embodiment.

The bucket 414 of the excavator 400 is moved so that a point on an edge of the bucket 414 touches the point on the surface. This is illustrated in FIG. 5A, were a point 540 on an edge of a bucket 514 touches a point 542. Either a predetermined edge of the bucket is touched to the point (e.g., right edge or left edge), or the particular edge touched to the point may be included as an input.

In some embodiments, the point 542 on the surface is a rigid point in that it does not move significantly (e.g., more than a 1-2 centimeters) after being measured using a survey pole and after being touched with the bucket 514. The point 542 on the surface may also be raised in some embodiments relative to surrounding portions of the surface to make touching the point easier at different orientations (or curl rotations) of the bucket 514.

While the edge of the bucket 514 is touching the point 542, the GNSS unit 404 performs a position measurement (a first position measurement) and also determines a first tilt and heading of the GNSS unit 404 on the stick 412.

The bucket 514 is then raised by the excavator so that the point 540 on the edge of the bucket 514 does not touch the point 542 on the surface. The bucket 514 is curled to change an orientation of the bucket 514 relative to the stick. Curling moves the bucket 514 from a first rotational position to a second rotational position. An angular rotation of the bucket 514 between the first rotational position and the second rotational position is determined using outputs from an angle sensor (e.g., an IMU) coupled to the bucket 514 or a linkage between the stick and bucket 514.

Figure 5B:
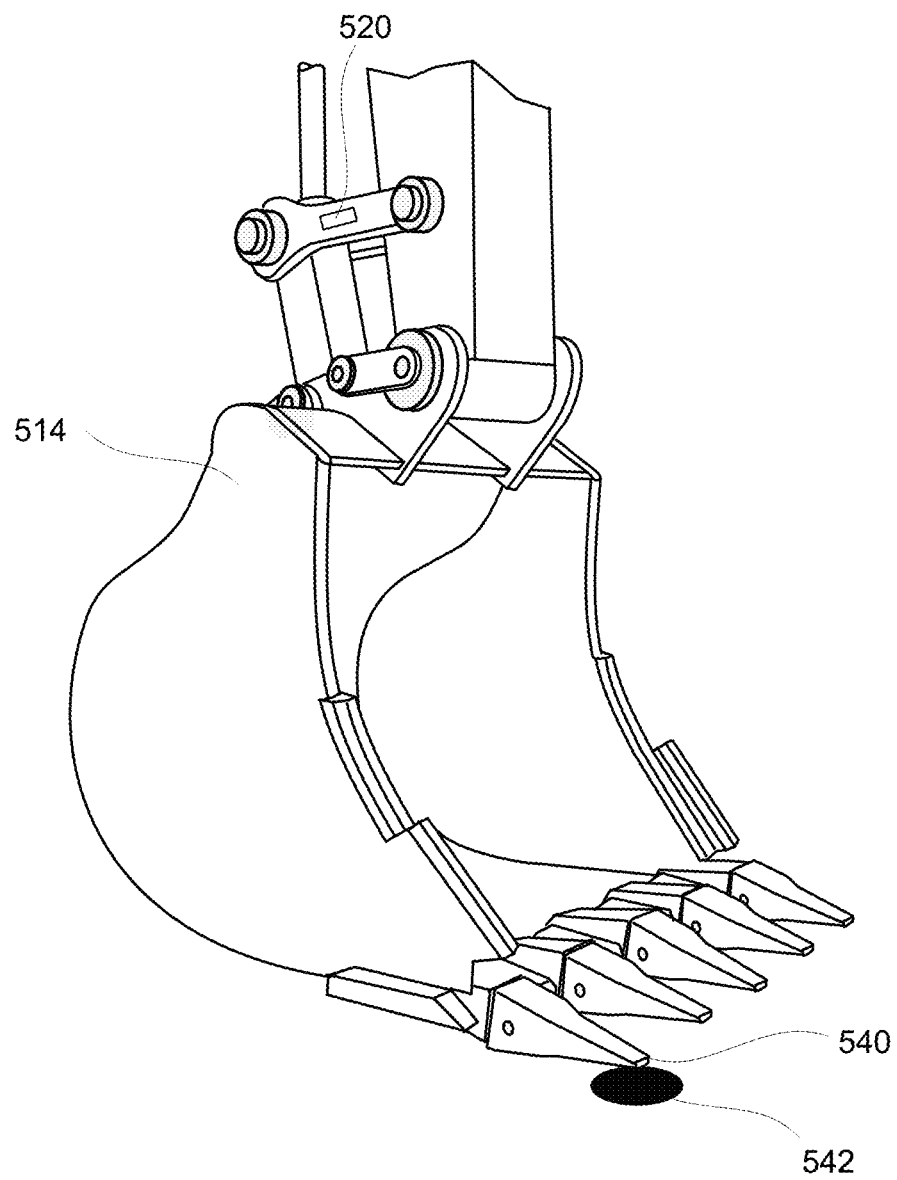

While at the second rotational position, the bucket 514 is moved so that the point 540 on the edge of the bucket 514 touches the point 542 on the surface. This is illustrated in FIG. 5B, where the point 540 on the edge of the bucket 514 touches the point 542 on the surface. This figure is similar to FIG. 5A, but as can be seen, the bucket 514 has been curled inward so that the second rotational position of the bucket 514 is different than the first rotational position.

While the edge of the bucket 514 is touching the point 542, the GNSS unit 404 performs a position measurement (a second position measurement) and also determines a second tilt and heading of the GNSS unit 404 on the stick 412. Because the rotational position of the bucket 514 has changed, the second tilt will be different than the first tilt.

Parameters that can be used for tracking movement of the bucket 514 during machine control operations can be determined using the position of the point 542 on the surface, the first position of the GNSS unit 404, the first tilt and heading of the GNSS unit 404, the angular rotation of the bucket 514 between the first rotational position and the second rotational position, the second position of the GNSS unit 404, and the second tilt and heading of the GNSS unit 404.

In some embodiments, the bucket 514 may be raised, curled, and then moved to touch the point 542 on the surface one or more additional times to provide additional measurements that can be used in determining the parameters.

Other measurements that can be used in determining the parameters may include one or more of a width of the bucket 514, a width of the stick, a horizontal distance from the GNSS unit 404 (or an antenna phase center of the GNSS unit 404) to an edge of the stick, and a distance between the GNSS unit 404 (or an antenna phase center of the GNSS unit 404) and a pivot point between the stick and bucket 514.

The parameters may include a position of the pivot point between the stick and bucket relative to the GNSS unit 404 and a distance from the pivot point to a working edge of the bucket 514. In the example shown in FIGS. 5A-5B, the working edge of the bucket 514 is at a tip of the bucket teeth.

In some embodiments, a virtual plane extending through a center of the stick and the bucket 514 may be determined, and the position of the pivot point between the stick and bucket and the distance from the pivot point to the working edge of the bucket are determined along the center plane or projected onto the center plane.

In some embodiments, the first position of the GNSS unit 404 may be obtained while the bucket 514 is fully extended outward, and the second position of the GNSS unit 404 is obtained while the bucket 514 is fully retracted inward (or vice versa). These positional orientations of the bucket 514 provide a full range of rotational motion of the bucket 514.

In other embodiments that include raising the bucket 514, curling the bucket 514, and touching the point 542 on the surface one or more additional times, at least one of the position measurements may be obtained while the bucket 514 is fully extended outward, and at least one of the position measurements may be obtained while the bucket 514 is fully retracted inward.

In yet other embodiments, position measurements are obtained while the bucket 514 is neither fully extended outward or fully retracted inward. Motion of the bucket 514 between the position measurements can be used to extrapolate the full range of positional orientations of the bucket 514.

While the commissioning process may include a number of steps that are performed by an operator (e.g., measuring the position of the point on the surface and/or moving the bucket), the measurements or information generated during the process may be used by a computing device (e.g., a cell phone or mobile controller) to generate the parameters used to track movement of the bucket 514 during machine control operations. The parameters may be generated using a commissioning application, and then the parameters may be used by a machine control application, both of which may be configured to run on the same computing device. Alternatively, the commissioning application may run on one computing device (e.g., a mobile computing device that is used with the GNSS unit for survey measurements), and the machine control application may run on a different computing device that is integrated with the excavator (e.g., a controller mounted in a cab of the excavator). In either case the computing device may include computer instructions that, when executed by one or more processors, cause the controller to perform the described functions.

Figure 6:
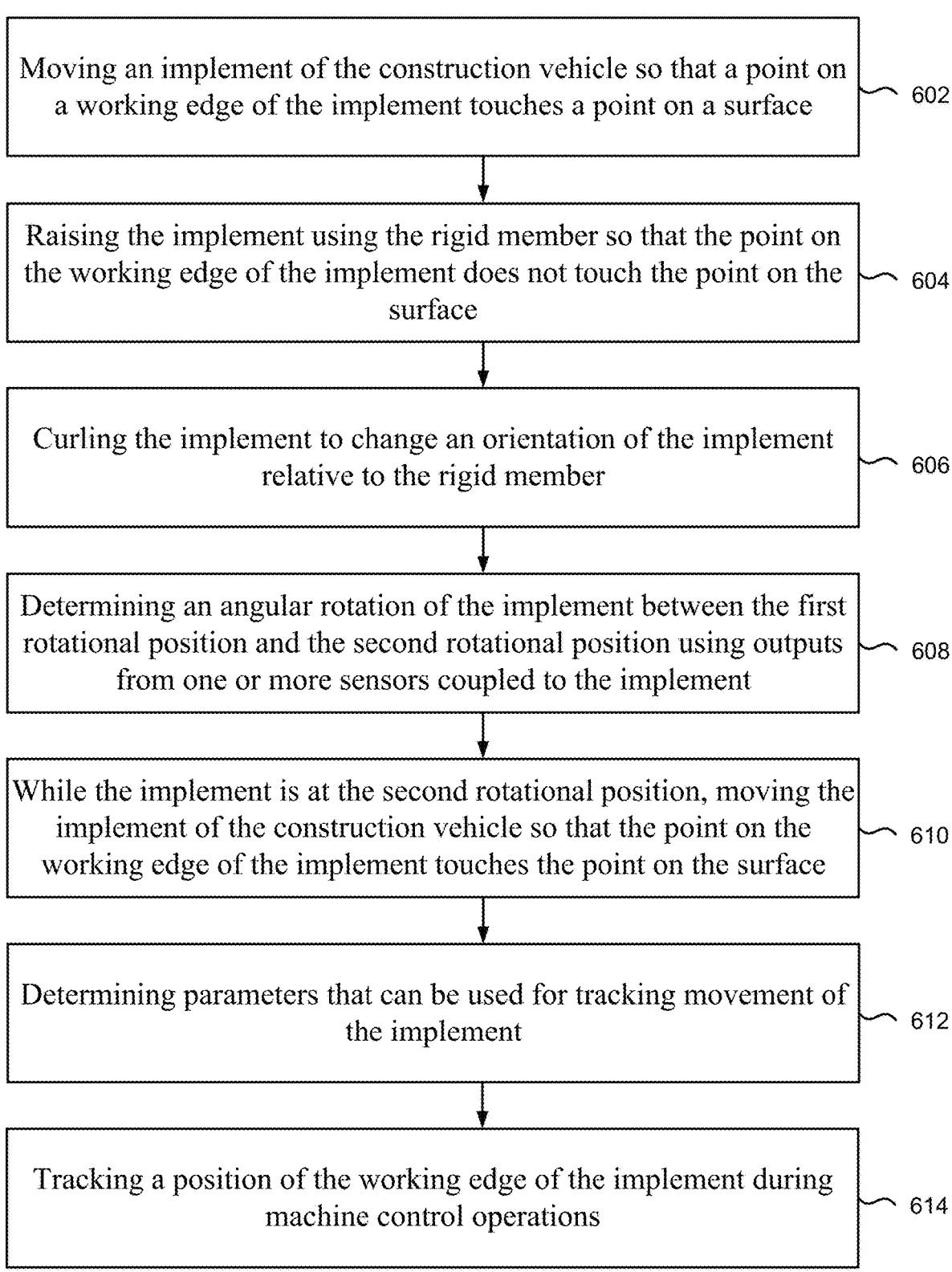
FIG. 6 is a flowchart providing a method for commissioning a construction vehicle for machine control operations in accordance with an embodiment.

FIG. 6 is a flowchart providing a method for commissioning a construction vehicle for machine control operations in accordance with an embodiment. The construction vehicle may be any time of construction vehicle that is coupled to an implement by a rigid member as described previously. The method includes moving the implement of the construction vehicle so that a point on a working edge of the implement touches a point on a surface (602). The point on the surface is at a known position that may have been determined previously or that has been (or will be) measured by an operator using a rover. The position of the point is used as an input in the commissioning process. In some embodiments, the position is measured using the GNSS receiver and a mobile controller in wireless communication with the GNSS receiver. The mobile controller may provide the position to a commissioning application running on the mobile controller.

The implement is moved by an operator of the construction vehicle. The implement may be, for example, a bucket or blade that is coupled to the construction vehicle with one or more rigid members. The operator moves the implement so that a particular point on the working edge touches the point on the surface. The particular point on the working edge may be a predefined point (e.g., a tip on the right or left end of the working edge) or details of the particular point may be input by the operator to the commissioning application.

While the point on the working edge of the implement is touching the point on the surface, the GNSS receiver is used to determine a first position of the GNSS receiver and to determine a first tilt and heading of the GNSS receiver. The GNSS receiver determines the position information and includes one or more sensors for determining the tilt and heading information. The GNSS receiver is coupled to the rigid member during the measurements as described previously. The first position and the first tilt and heading are inputs to the commissioning application.

The method also includes raising the implement using a rigid member so that the point on the working edge of the implement does not touch the point on the surface (604). The implement is raised by the operator of the construction vehicle.

The method also includes curling the implement to change an orientation of the implement relative to the rigid member (606). The implement is curled by the operator of the construction vehicle to move the implement from a first rotational position relative to the rigid member to a second rotational position.

The method also includes determining an angular rotation of the implement between the first rotational position and the second rotational position using outputs from one or more sensors coupled to the implement (608). The one or more sensors may include IMUs. The angular rotation is an input to the commissioning application.

The method also includes, while the implement is at the second rotational position, moving the implement of the construction vehicle so that the point on the working edge of the implement touches the point on the surface (610). The implement is moved by the operator of the construction vehicle. The operator moves the implement so that the same point on the working edge touches the point on the surface (e.g., within a few centimeters). The accuracy with which the operator touches the same point on the working edge to the point on the surface will impact the accuracy of the commissioning process.

While the point on the working edge of the implement is touching the point on the surface, the GNSS receiver is used to determine a second position of the GNSS receiver and to determine a second tilt and heading of the GNSS receiver. The second position and the second tilt and heading are inputs to the commissioning application.

The method also includes determining parameters that can be used for tracking movement of the implement (612). The parameters are determined using the position of the point on the surface, the first position of the GNSS receiver, the first tilt and heading of the GNSS receiver, the angular rotation of the implement between the first rotational position and the second rotational position, the second position of the GNSS receiver, and the second tilt and heading of the GNSS receiver. The parameters may include a position of a pivot point between the rigid member and implement relative to the GNSS receiver and a distance from the pivot point to the working edge of the implement. The parameters are determined as outputs from the commissioning application.

The method may also include tracking a position of the working edge of the implement during machine control operations (614). The position of the working edge of the implement may be tracked using the parameters from the commissioning application and position information from the GNSS receiver, tilt and heading information from the GNSS receiver, and angular rotation information from the one or more sensors coupled to the implement.

It should be appreciated that the specific steps illustrated in FIG. 6 provide a particular method for commissioning a construction vehicle for machine control operations in accordance with an embodiment. Other sequences of steps may also be performed according to alternative embodiments. For example, alternative embodiments may perform the steps outlined above in a different order. Moreover, the individual steps illustrated in FIG. 6 may include multiple sub-steps that may be performed in various sequences. Furthermore, additional steps may be added or removed depending on the particular application.

Figure 7:
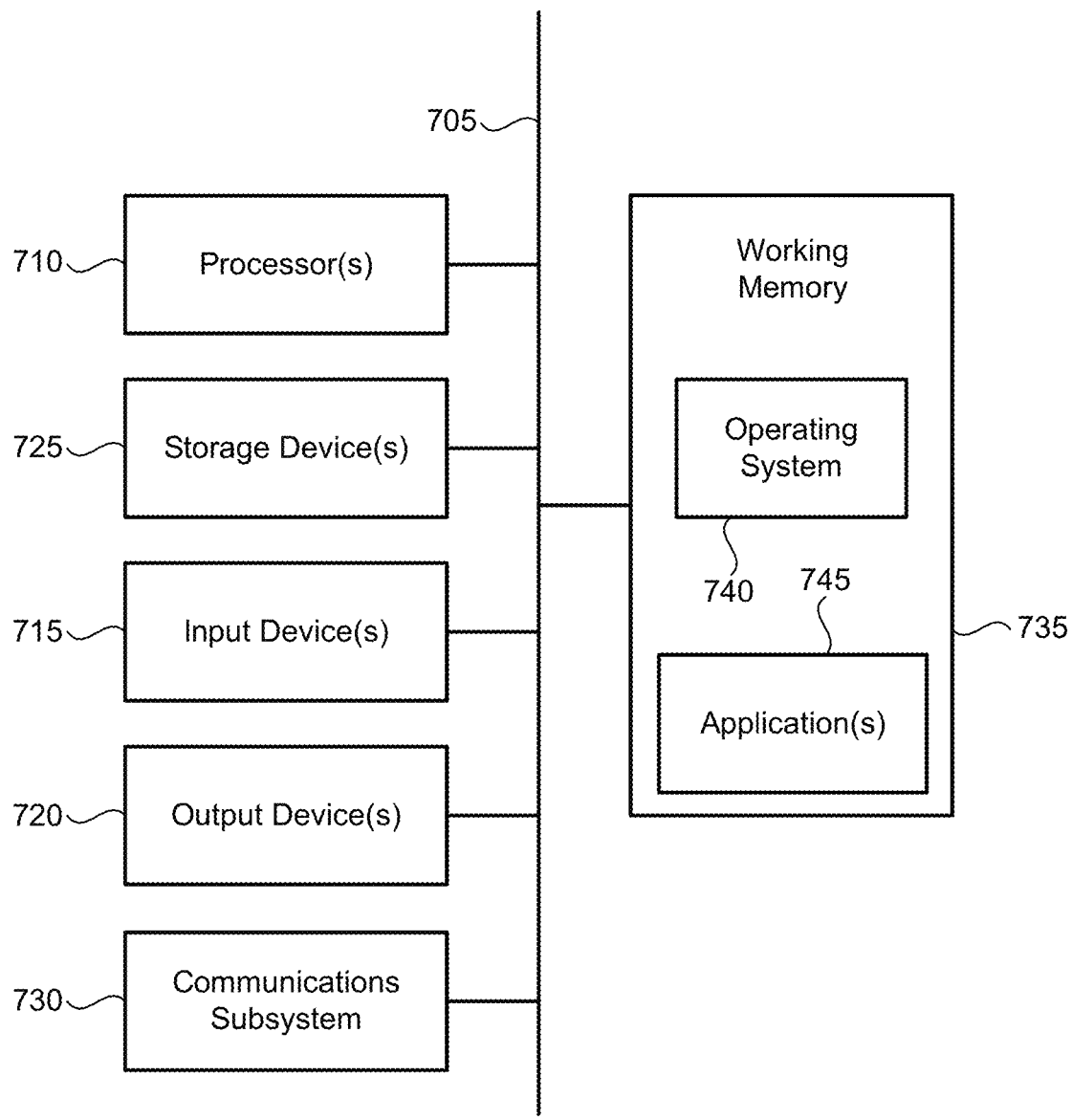
FIG. 7 is a simplified block diagram of a controller in accordance with an embodiment.

FIG. 7 is a simplified block diagram of a controller 700 in accordance with an embodiment. The controller 700 in this example includes a communications subsystem 730 that allows communications with a GNSS unit and one or more angle sensors. The controller 700 also includes one or more applications 745, for example, for performing a commissioning process and/or tracking a position of a working edge of an implement during machine control operations. The controller 700 may also include working memory 735 with instructions that when executed by the one or more processors 710, provide an operating system 740 and the applications 745 that facilitate these functions.

The controller 700 in FIG. 7 is provided merely an example. Other controllers having different configurations may be used with the embodiments described herein. The controller 700 illustrated in FIG. 7 may be incorporated into devices such as a portable electronic device, cell phone, or other computing devices. FIG. 7 provides a schematic illustration of one embodiment of a controller 700 that can perform some or all of the steps of the methods provided by various embodiments. It should be noted that FIG. 7 is meant only to provide a generalized illustration of various components, any or all of which may be utilized as appropriate.

The controller 700 is shown comprising physical or functional elements that can be electrically coupled via a bus 705, or may otherwise be in communication, as appropriate. The hardware elements may include one or more processors 710, including without limitation one or more general-purpose processors and/or one or more special-purpose processors such as digital signal processing chips, graphics acceleration processors, and/or the like; one or more input devices 715, which can include, without limitation a mouse, a keyboard, a touchscreen, a camera, and/or the like; and one or more output devices 720, which can include, without limitation a display device, a printer, and/or the like.

The controller 700 may further include and/or be in communication with one or more non-transitory storage devices 725, which may comprise, without limitation, local and/or network accessible storage. Such storage devices may be configured to implement any appropriate data stores, including without limitation, various file systems, database structures, and/or the like.

The controller 700 may also include a communications subsystem 730, which can include, without limitation, a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 730 may include one or more input and/or output communication interfaces to permit data to be exchanged with other devices such as a GNSS unit and angle sensor. In some embodiments, the controller 700 may further comprise a working memory 735.

The controller 700 can also include software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a processor. In an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 725. In some cases, the storage medium might be incorporated within a computer system, such as the controller 700. In other embodiments, the storage medium might be separate, e.g., a removable medium. These instructions might take the form of executable code, which is executable by the controller 700 and/or might take the form of source and/or installable code, which, upon compilation and/or installation on the controller 700, e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ the controller 700 to perform methods in accordance with various embodiments. According to a set of embodiments, some or all of the procedures of such methods are performed by the controller 700 in response to the one or more processor(s) 710 executing one or more sequences of one or more instructions, which might be incorporated into the operating system 740 and/or other code, such as an application program 745, contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the controller 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media.

The communications subsystem 730 and/or components thereof generally will receive signals, and the bus 705 then might carry the signals and/or the data, instructions, etc. carried by the signals to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques may have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

What is claimed is:

1. A method for commissioning an excavator for machine control operations, the method comprising:
   measuring a position of a point on a surface using a Global Navigation Satellite System (GNSS) receiver, the GNSS receiver configured to receive GNSS signals for determining position information and configured to receive inertial measurement unit (IMU) outputs for determining tilt and heading information;
   coupling the GNSS receiver to a mount on a stick of the excavator;
   moving a bucket of the excavator so that a point on an edge of the bucket touches the point on the surface, and while the point on the edge of the bucket is touching the point on the surface, using the GNSS receiver to:
      determine a first position of the GNSS receiver on the stick; and
      determine a first tilt and heading of the GNSS receiver on the stick;
   raising the bucket so that the point on the edge of the bucket does not touch the point on the surface;
   curling the bucket to change an orientation of the bucket relative to the stick, wherein curling the bucket moves the bucket from a first rotational position to a second rotational position;
   determining an angular rotation of the bucket between the first rotational position and the second rotational position using outputs from an IMU coupled to the bucket;
   while the bucket is at the second rotational position, moving the bucket of the excavator so that the point on the edge of the bucket touches the point on the surface, and while the point on the edge of the bucket is touching the point on the surface, using the GNSS receiver to:
      determine a second position of the GNSS receiver on the stick; and
      determine a second tilt and heading of the GNSS receiver on the stick;
   determining parameters that can be used for tracking movement of the bucket, wherein the parameters are determined based at least in part on the position of the point on the surface, the first position of the GNSS receiver on the stick, the first tilt and heading of the GNSS receiver on the stick, the angular rotation of the bucket between the first rotational position and the second rotational position, the second position of the GNSS receiver on the stick, and the second tilt and heading of the GNSS receiver on the stick; and
   tracking a position of a working edge of the bucket during machine control operations using at least the parameters, the position information from the GNSS receiver, the tilt and heading information from the GNSS receiver, and angular rotation information from the IMU coupled to the bucket.

2. The method of claim 1 further comprising calibrating the IMU outputs for determining the tilt and heading information after coupling the GNSS receiver to the mount on the stick of the excavator.

3. The method of claim 1 wherein the GNSS receiver is coupled to a survey pole, and measuring the position of the point on the surface comprises placing a tip of the survey pole on the point on the surface, and the GNSS receiver is coupled to the mount on the stick of the excavator by coupling the survey pole to the mount.

4. The method of claim 1 wherein the parameters are also determined based on a width of the working edge of the bucket, a width of the stick, and a location of the point on the edge of the bucket.

5. A method for commissioning an excavator for machine control operations, the excavator having a Global Navigation Satellite System (GNSS) receiver removably coupled to a stick of the excavator, the GNSS receiver configured to receive GNSS signals for determining position information and configured to receive sensor outputs for determining tilt and heading information, the method comprising:
   moving a bucket of the excavator so that a point on an edge of the bucket touches a point on a surface, the point on the surface being at a known position, and while the point on the edge of the bucket is touching the point on the surface, using the GNSS receiver to:
      determine a first position of the GNSS receiver on the stick; and
      determine a first tilt and heading of the GNSS receiver on the stick;
   raising the bucket so that the point on the edge of the bucket does not touch the point on the surface;

curling the bucket to change an orientation of the bucket relative to the stick, wherein curling the bucket moves the bucket from a first rotational position to a second rotational position;

determining an angular rotation of the bucket between the first rotational position and the second rotational position using outputs from one or more sensors coupled to the bucket;

while the bucket is at the second rotational position, moving the bucket of the excavator so that the point on the edge of the bucket touches the point on the surface, and while the point on the edge of the bucket is touching the point on the surface, using the GNSS receiver to:

determine a second position of the GNSS receiver on the stick; and determine a second tilt and heading of the GNSS receiver on the stick;

determining parameters that can be used for tracking movement of the bucket, wherein the parameters are determined based at least in part on the known position of the point on the surface, the first position of the GNSS receiver on the stick, the first tilt and heading of the GNSS receiver on the stick, the angular rotation of the bucket between the first rotational position and the second rotational position, the second position of the GNSS receiver on the stick, and the second tilt and heading of the GNSS receiver on the stick.

6. The method of claim 5 further comprising obtaining additional measurement information by repeating one or more times the steps of raising the bucket, curling the bucket, determining angular rotation of the bucket, moving the bucket so that the point on the edge of the bucket touches the point on the surface, and using the GNSS receiver to determine position, tilt, and heading information, and using the additional measurement information in determining the parameters.

7. The method of claim 5 wherein the parameters are also determined based on a width of a working edge of the bucket, a width of the stick, and a location of the point on the edge of the bucket.

8. The method of claim 5 wherein the sensor outputs for determining the tilt and heading information are received from an IMU integrated with the GNSS receiver.

9. The method of claim 5 wherein the point on the surface is a rigid point that is in approximately the same position in world coordinates before and after being touched by the point on the edge of the bucket.

10. The method of claim 5 wherein the point on the surface is raised relative to surrounding portions of the surface so that the point on the edge of the bucket touches the point on the surface at the first rotational position of the bucket in a fully extended position and at the second rotational position of the bucket in a fully retracted position.

11. The method of claim 5 further comprising mounting a mobile controller of the GNSS receiver in a cab of the excavator after using the mobile controller to measure the first position of the point on the surface.

12. The method of claim 5 wherein the one or more sensors coupled to the bucket are attached to a linkage between the stick and bucket.

13. The method of claim 5 further comprising tracking a position of a working edge of the bucket during machine control operations using at least the parameters, the position information from the GNSS receiver, the tilt and heading information from the sensor outputs, and angular rotation information from the one or more sensors coupled to the bucket.

14. The method of claim 5 further comprising:

measuring a position of the point on the surface using the GNSS receiver to provide the known position; and coupling the GNSS receiver to the stick of the excavator.

15. A method for commissioning a construction vehicle for machine control operations, the construction vehicle having a Global Navigation Satellite System (GNSS) receiver removably coupled to a rigid member of the construction vehicle, the GNSS receiver configured to receive GNSS signals for determining position information and configured to receive sensor outputs for determining tilt and heading information, the method comprising:

moving an implement of the construction vehicle so that a point on a working edge of the implement touches a point on a surface, the point on the surface being at a known position, and while the point on the working edge of the implement is touching the point on the surface, using the GNSS receiver to:

determine a first position of the GNSS receiver on the rigid member; and determine a first tilt and heading of the GNSS receiver on the rigid member;

raising the implement using the rigid member so that the point on the working edge of the implement does not touch the point on the surface;

curling the implement to change an orientation of the implement relative to the rigid member, wherein curling the implement moves the implement from a first rotational position to a second rotational position;

determining an angular rotation of the implement between the first rotational position and the second rotational position using outputs from one or more sensors coupled to the implement;

while the implement is at the second rotational position, moving the implement of the construction vehicle so that the point on the working edge of the implement touches the point on the surface, and while the point on the working edge of the implement is touching the point on the surface, using the GNSS receiver to:

determine a second position of the GNSS receiver on the rigid member; and determine a second tilt and heading of the GNSS receiver on the rigid member;

determining parameters that can be used for tracking movement of the implement, wherein the parameters are determined based at least in part on the known position of the point on the surface, the first position of the GNSS receiver on the rigid member, the first tilt and heading of the GNSS receiver on the rigid member, the angular rotation of the implement between the first rotational position and the second rotational position, the second position of the GNSS receiver on the rigid member, and the second tilt and heading of the GNSS receiver on the rigid member.

16. The method of claim 15 further comprising:

measuring a position of the point on the surface using the GNSS receiver to provide the known position; and coupling the GNSS receiver to the rigid member of the construction vehicle.

17. The method of claim 15 wherein the sensor outputs received by the GNSS receiver are provided by an inertial measurement unit (IMU) integrated with the GNSS receiver, and wherein the one or more sensors coupled to the implement include one or more IMUs.

18. The method of claim 15 wherein the construction vehicle is a skidsteer, and the implement is a bucket coupled to the skidsteer by the rigid member, the rigid member including arms of the skidsteer.

19. The method of claim 15 further comprising tracking a position of the working edge of the implement during machine control operations using at least the parameters, the position information from the GNSS receiver, the tilt and heading information from the sensor outputs, and angular rotation information from the one or more sensors coupled to the implement.

20. The method of claim 15 further comprising calibrating the GNSS receiver for determining the tilt and heading information after coupling the GNSS receiver to the rigid member of the construction vehicle.

* * * * *